United States Patent
Zheng et al.

(10) Patent No.: US 10,782,677 B2
(45) Date of Patent: Sep. 22, 2020

(54) SYSTEM AND METHOD FOR NETWORK INTEGRATION OF SENSOR DEVICES WITHIN A DRILLING MANAGEMENT NETWORK HAVING A CONTROL SYSTEM

(71) Applicant: Schlumberger Technology Corporation, Sugar Land, TX (US)

(72) Inventors: Shunfeng Zheng, Katy, TX (US); Franck Cedric Yanou Ngongang, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 15/714,533

(22) Filed: Sep. 25, 2017

(65) Prior Publication Data

US 2019/0094840 A1 Mar. 28, 2019

(51) Int. Cl.
| | |
|---|---|
| *G06Q 10/06* | (2012.01) |
| *G05B 19/418* | (2006.01) |
| *G06F 21/33* | (2013.01) |
| *H04L 29/06* | (2006.01) |

(52) U.S. Cl.
CPC ......... *G05B 19/4185* (2013.01); *G06F 21/33* (2013.01); *H04L 63/0823* (2013.01); *G05B 2219/45129* (2013.01)

(58) Field of Classification Search
CPC ..................................................... G06Q 10/06
USPC ........................................................ 700/117
See application file for complete search history.

(56) References Cited

U.S. PATENT DOCUMENTS

| | | | |
|---|---|---|---|
| 6,873,267 B1 | 3/2005 | Tubel et al. | |
| 7,574,325 B2 | 8/2009 | Dykstra | |
| 7,591,307 B2* | 9/2009 | Gibson | E21B 23/00 |
| | | | 166/250.13 |
| 8,326,538 B2* | 12/2012 | Hobbs | E21B 47/12 |
| | | | 702/6 |
| 8,616,274 B2 | 12/2013 | Belcher et al. | |
| 9,024,778 B2 | 5/2015 | Winkler et al. | |
| 9,094,407 B1* | 7/2015 | Matthieu | H04W 4/70 |
| 9,157,279 B2* | 10/2015 | Schumacher | E21B 44/00 |
| 9,228,401 B2* | 1/2016 | Edwards | E21B 21/08 |
| 9,322,247 B2 | 4/2016 | Rojas et al. | |
| 9,429,009 B2 | 8/2016 | Paulk et al. | |
| 9,441,428 B1 | 9/2016 | Barnes et al. | |
| 9,845,664 B2 | 12/2017 | Nield | |
| 2003/0101519 A1* | 6/2003 | Gayme | D06F 37/203 |
| | | | 8/159 |
| 2009/0090555 A1* | 4/2009 | Boone | E21B 44/02 |
| | | | 175/45 |
| 2009/0146836 A1* | 6/2009 | Santoso | E21B 47/12 |
| | | | 340/854.4 |
| 2009/0250263 A1* | 10/2009 | Saha | E21B 7/022 |
| | | | 175/24 |

(Continued)

*Primary Examiner* — Suresh Suryawanshi
(74) *Attorney, Agent, or Firm* — Rachel E. Greene

(57) ABSTRACT

A method may include establishing a network connection between a sensor device and a drilling management network. The method may further include obtaining, from a control system in the drilling management network, a request for sensor data from a sensor device coupled to the drilling management network. The method may further include transmitting, using a communication protocol and over the drilling management network, the sensor data from the sensor device to the control system.

20 Claims, 7 Drawing Sheets

(56) References Cited

U.S. PATENT DOCUMENTS

| | | | |
|---|---|---|---|
| 2012/0173218 A1* | 7/2012 | Shafer | E21B 41/00 703/7 |
| 2012/0318578 A1* | 12/2012 | Schumacher | E21B 44/00 175/40 |
| 2014/0344301 A1* | 11/2014 | McDonough | G06Q 10/06 707/758 |
| 2015/0053483 A1* | 2/2015 | Mebane, III | E21B 44/00 175/26 |
| 2016/0186531 A1 | 6/2016 | Harkless et al. | |
| 2016/0290119 A1* | 10/2016 | Tunc | G05B 15/02 |
| 2016/0290120 A1* | 10/2016 | Zheng | E21B 3/02 |
| 2016/0305236 A1* | 10/2016 | Forsberg | E21B 47/12 |
| 2016/0369619 A1* | 12/2016 | Parmeshwar | E21B 47/04 |
| 2017/0167853 A1* | 6/2017 | Zheng | G01B 11/043 |
| 2018/0184339 A1* | 6/2018 | Hehn | H04W 76/12 |

* cited by examiner

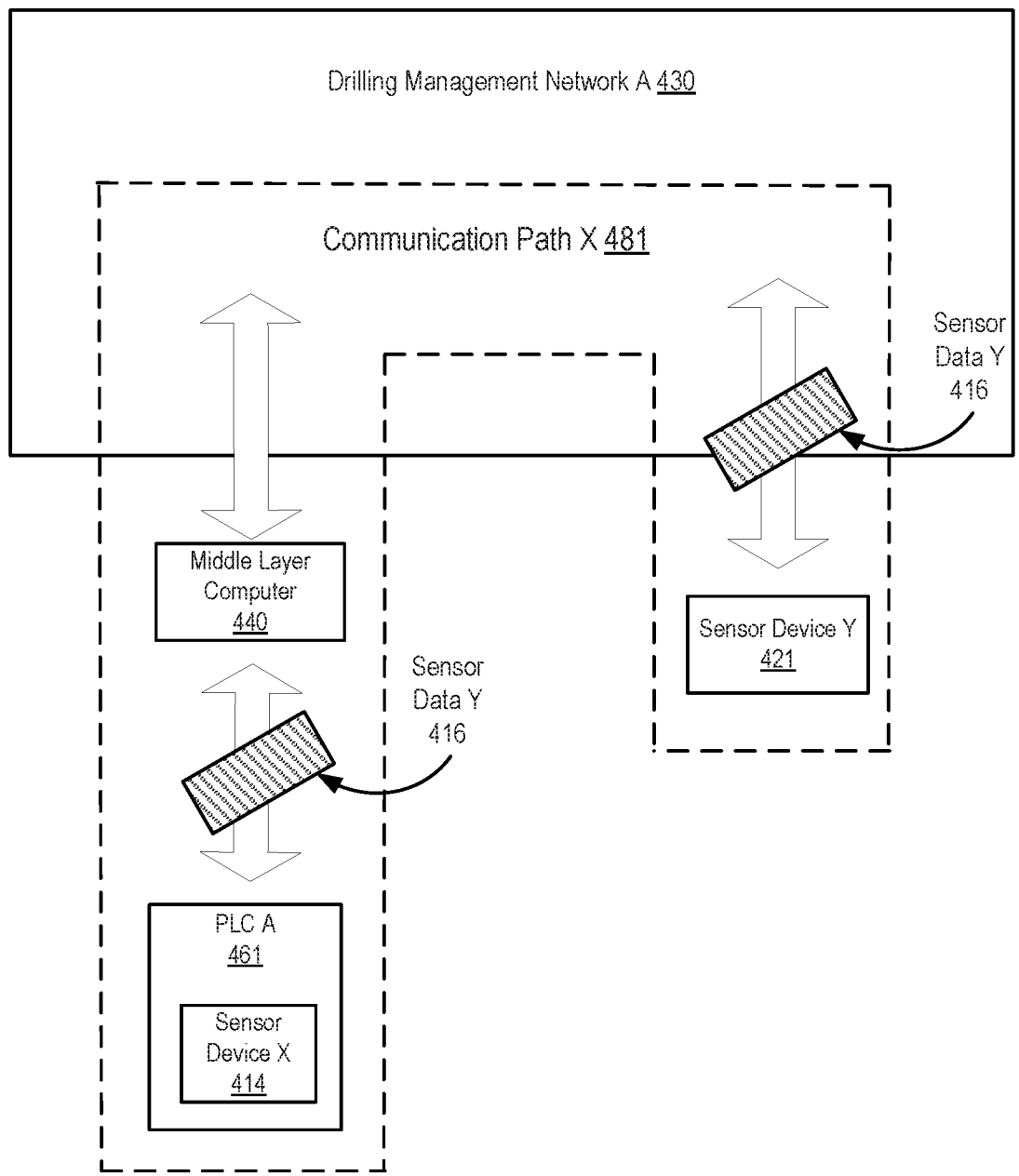
FIG. 4.1

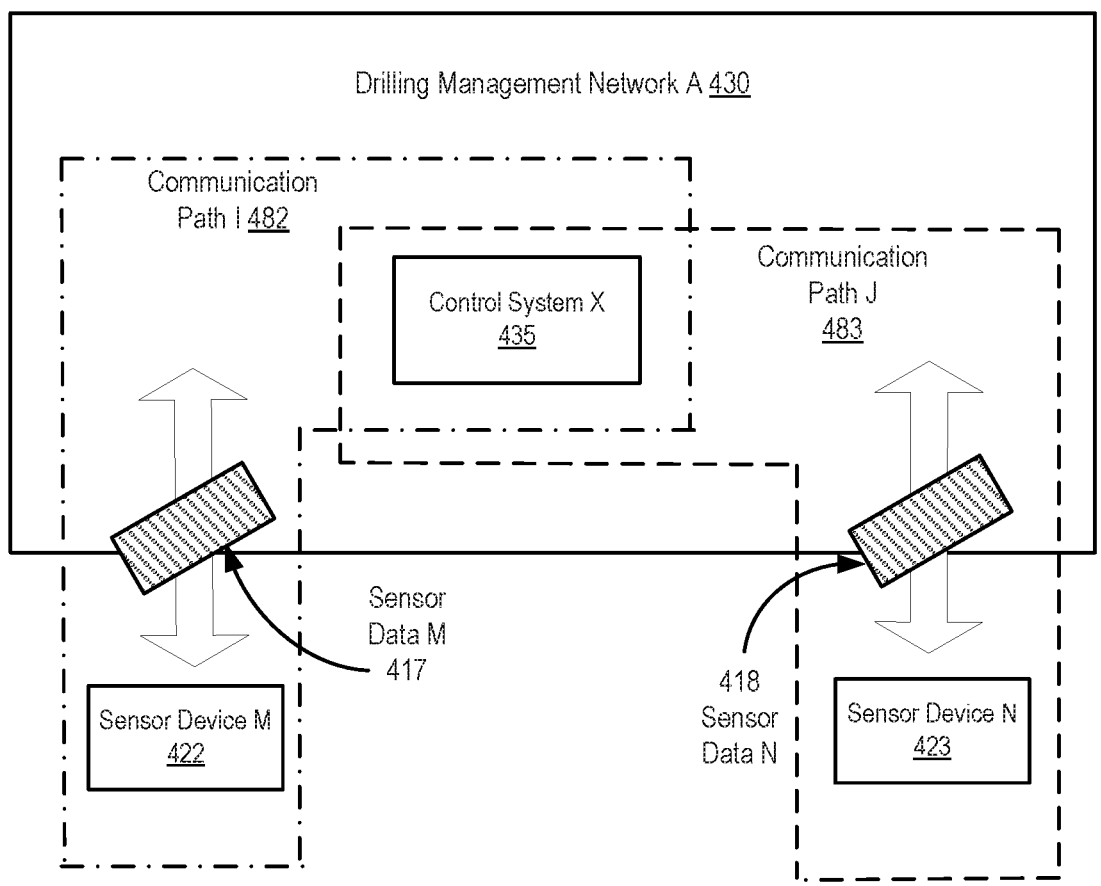
FIG. 4.2

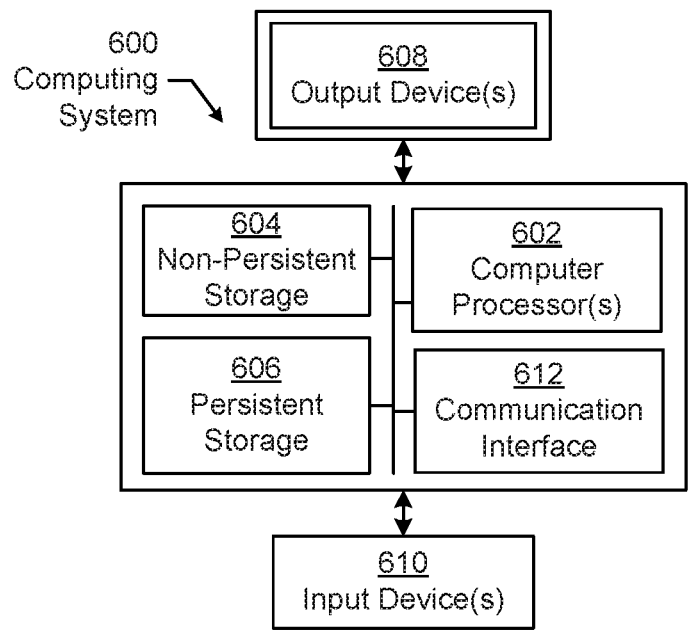
*FIG. 6.1*
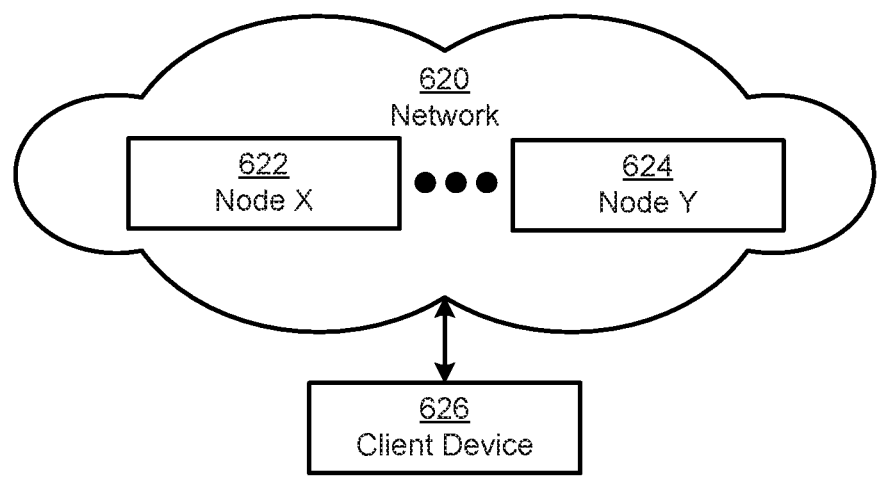
*FIG. 6.2*

SYSTEM AND METHOD FOR NETWORK INTEGRATION OF SENSOR DEVICES WITHIN A DRILLING MANAGEMENT NETWORK HAVING A CONTROL SYSTEM

BACKGROUND

Various network devices may be disposed throughout a drilling rig in order to control various operations on the drilling rig. These network devices may control drilling equipment, monitor the performance of the drilling rig, and/or perform various maintenance operations with respect to the drilling rig. In particular, these network device may include sensors that collect sensor measurements around the drilling rig. Accordingly, various problems exist in regard to effective utilization of sensor data between different network devices on the drilling rig.

SUMMARY

In general, in one aspect, the disclosed technology relates to a method. The method includes establishing a network connection between a sensor device and a drilling management network. The method further includes obtaining, from a control system in the drilling management network, a request for sensor data from a sensor device coupled to the drilling management network. The method further includes transmitting, using a communication protocol and over the drilling management network, the sensor data from the sensor device to the control system.

In general, in one aspect, the disclosed technology relates to a system. The system includes a sensor device that includes a communication interface and sensor circuitry. The system further includes a drilling management network coupled to the sensor device. The drilling management network includes a control system and various network elements. The drilling management network establishes a network connection between the sensor device and the drilling management network. The drilling management network further obtains, from a control system in the drilling management network, a request for sensor data from the sensor device. The drilling management network further transmits, using a communication protocol, the sensor data from the sensor device to the control system. The control system includes a programmable logic controller that performs one or more drilling operations with a drilling rig using the sensor data.

In general, in one aspect, the disclosed technology relates to a sensor device. The sensor device includes a communication interface, a processor, sensor circuitry, and a memory. The memory includes instructions executable by the processor and that establish a network connection with a drilling management network. The memory further includes instructions executable by the processor and that generate, using sensor circuitry, at least one sensor measurement regarding one or more environmental conditions proximate the sensor device. The memory further includes instructions executable by the processor and that process the at least one sensor measurement to produce sensor data. The memory further includes instructions executable by the processor and that transmits, using a communication protocol, the sensor data to a control system located on the drilling management network. The control system includes a programmable logic controller that performs one or more drilling operations with a drilling rig using the sensor data.

Other aspects of the disclosure will be apparent from the following description and the appended claims.

BRIEF DESCRIPTION OF DRAWINGS

FIGS. 4.1 and 4.2 show examples in accordance with one or more embodiments.

FIGS. 6.1 and 6.2 show a computing system in accordance with one or more embodiments.

DETAILED DESCRIPTION

Figure 1:
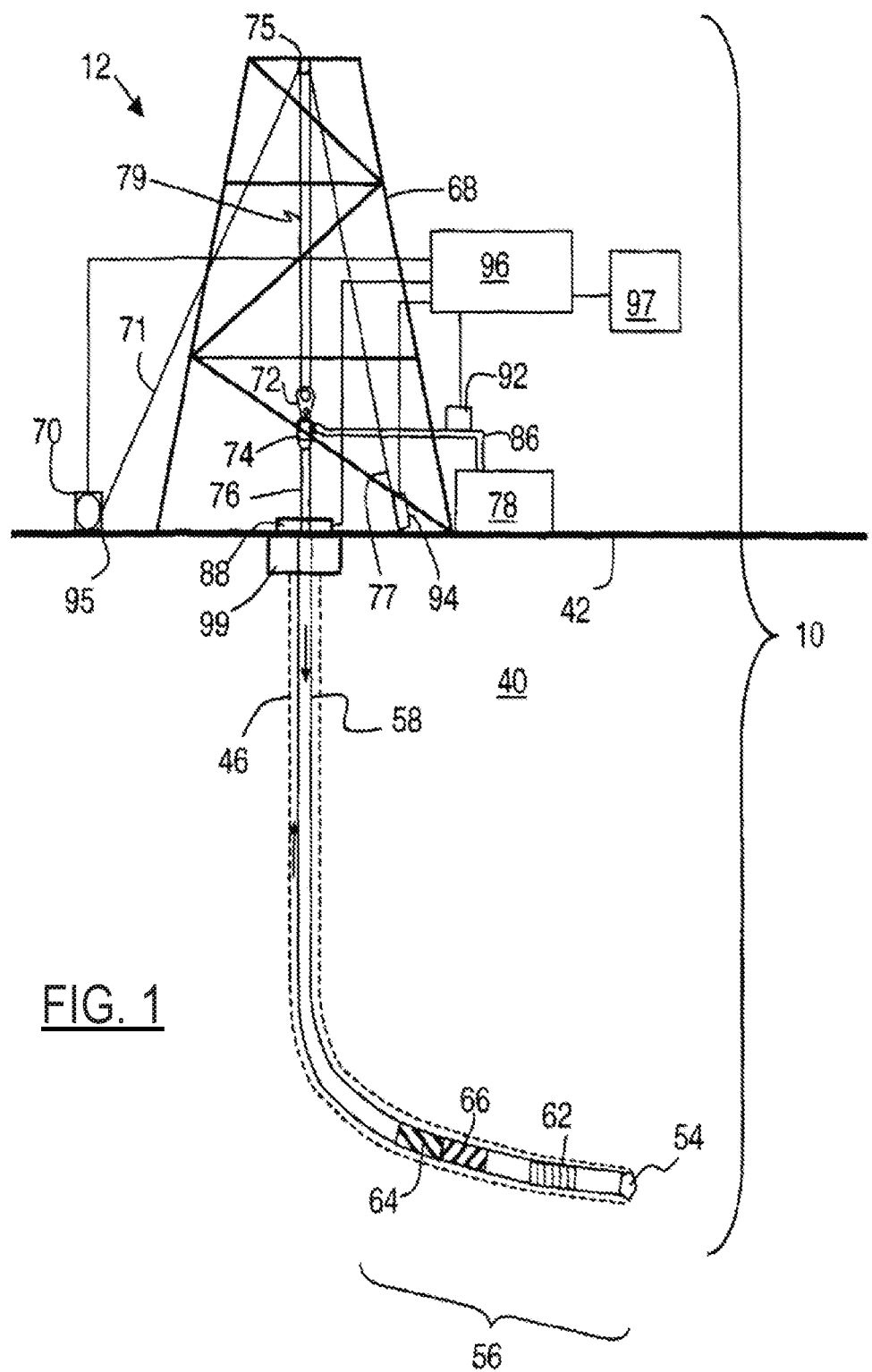
FIGS. 1 and 2 show systems in accordance with one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include a system, a sensor device, and various methods for communicating sensor data over a drilling management network. In particular, one or more embodiments are directed to a method that includes establishing a network connection directly between a smart sensor device and a drilling management network. For example, a smart sensor device may be a sensor device that includes a communication interface for receiving and transmitting data, such as sensor data, over the drilling management network. One or more control systems on the drilling management network may subscribe to the smart sensor device in order to obtain the sensor data. Likewise, a control system may obtain the sensor data, analyze the sensor data for whether the type of sensor data is used by any application, and then either use or ignore the sensor data accordingly. As such, the sensor data may be transmitted over the drilling management network by implementing a communication protocol that directs sensor data from the smart sensor device to control systems.

FIG. 1 shows a block diagram of a system in accordance with one or more embodiments. FIG. 1 shows a drilling system (10) according to one or more embodiments. Drill string (58) is shown within borehole (46). Borehole (46) may be located in the earth (40) having a surface (42). Borehole (46) is shown being cut by the action of drill bit (54). Drill bit (54) may be disposed at the far end of the bottom hole assembly (56) that is attached to and forms the lower portion of drill string (58). Bottom hole assembly (56) may include a number of devices including various subassemblies. Measurement-while-drilling (MWD) subassemblies may be included in subassemblies (62). Examples of MWD measurements may include direction, inclination, survey data, downhole pressure (inside the drill pipe, and/or outside and/or annular pressure), resistivity, density, and porosity. Subassemblies (62) may also include a subassembly for measuring torque and weight on the drill bit (54). The signals from the subassemblies (62) may be processed in a processor (66). After processing, the information from processor (66) may be communicated to pulser assembly (64). Pulser assembly (64) may convert the information from the processor (66) into pressure pulses in the drilling fluid. The pressure pulses may be generated in a particular pattern which represents the data from the subassemblies (62). The pressure pulses may travel upwards though the drilling fluid in the central opening in the drill string and towards the surface system. The subassemblies in the bottom hole assembly (56) may further include a turbine or motor for providing power for rotating and steering drill bit (54).

The drilling rig (12) may include a derrick (68) and hoisting system, a rotating system, and/or a mud circulation system, for example. The hoisting system may suspend the drill string (58) and may include draw works (70), fast line (61), crown block (65), drilling line (69), traveling block and hook (62), swivel (64), and/or deadline 77. The rotating system may include a kelly (66), a rotary table (88), and/or engines (not shown). The rotating system may impart a rotational force on the drill string (58). Likewise, the embodiments shown in FIG. 1 may be applicable to top drive drilling arrangements as well. Although the drilling system (10) is shown being on land, those of skill in the art will recognize that the described embodiments are equally applicable to marine environments as well.

The mud circulation system may pump drilling fluid down an opening in the drill string. The drilling fluid may be called mud, which may be a mixture of water and/or diesel fuel, special clays, and/or other chemicals. The mud may be stored in mud pit (68). The mud may be drawn into mud pumps (not shown), which may pump the mud though stand pipe (86) and into the kelly (66) through swivel (64), which may include a rotating seal. Likewise, the described technologies may also be applicable to underbalanced drilling. If underbalanced drilling is used, at some point prior to entering the drill string, gas may be introduced into the mud using an injection system (not shown).

The mud may pass through drill string (58) and through drill bit (54). As the cutting elements of the drill bit (54) grind and gouge the earth formation into cuttings, the mud may be ejected out of openings or nozzles in the drill bit (54). These jets of mud may lift the cuttings off the bottom of the hole and away from the drill bit (54), and up towards the surface in the annular space between drill string (58) and the wall of borehole (46).

At the surface, the mud and cuttings may leave the well through a side outlet at bellnipper (not shown) above blowout preventer (99) and through mud return line (not shown). Blowout preventer (99) comprises a pressure control device and associated seal. The mud return line may feed the mud into one or more separator (not shown) which may separate the mud from the cuttings. From the separator, the mud may be returned to mud pit (68) for storage and re-use.

Various sensor devices may be placed on the drilling rig (12) to take measurements of the drilling equipment. In particular, a hookload may be measured by hookload sensor (94) mounted on deadline 77, block position and the related block velocity may be measured by a block sensor (95) which may be part of the draw works (70). Surface torque may be measured by a sensor device on the rotary table (88). Standpipe pressure may be measured by pressure sensor (92), located on standpipe (86). Signals from these measurements may be communicated to a surface processor (96) or other network elements (not shown) disposed around the drilling rig (12). In addition, mud pulses traveling up the drillstring may be detected by pressure sensor (92). For example, pressure sensor (92) may include a transducer that converts the mud pressure into electronic signals. The pressure sensor (92) may be connected to surface processor (96) that converts the signal from the pressure signal into digital form, stores and demodulates the digital signal into useable MWD data. According to various embodiments described above, surface processor (96) may be programmed to automatically detect one or more rig states based on the various input channels described. Processor (96) may be programmed, for example, to carry out an automated event detection as described above. Processor (96) may transmit a particular rig state and/or event detection information to user interface system (97) which may be designed to warn various drilling personnel of events occurring on the rig and/or suggest activity to the drilling personnel to avoid specific events.

Figure 2:
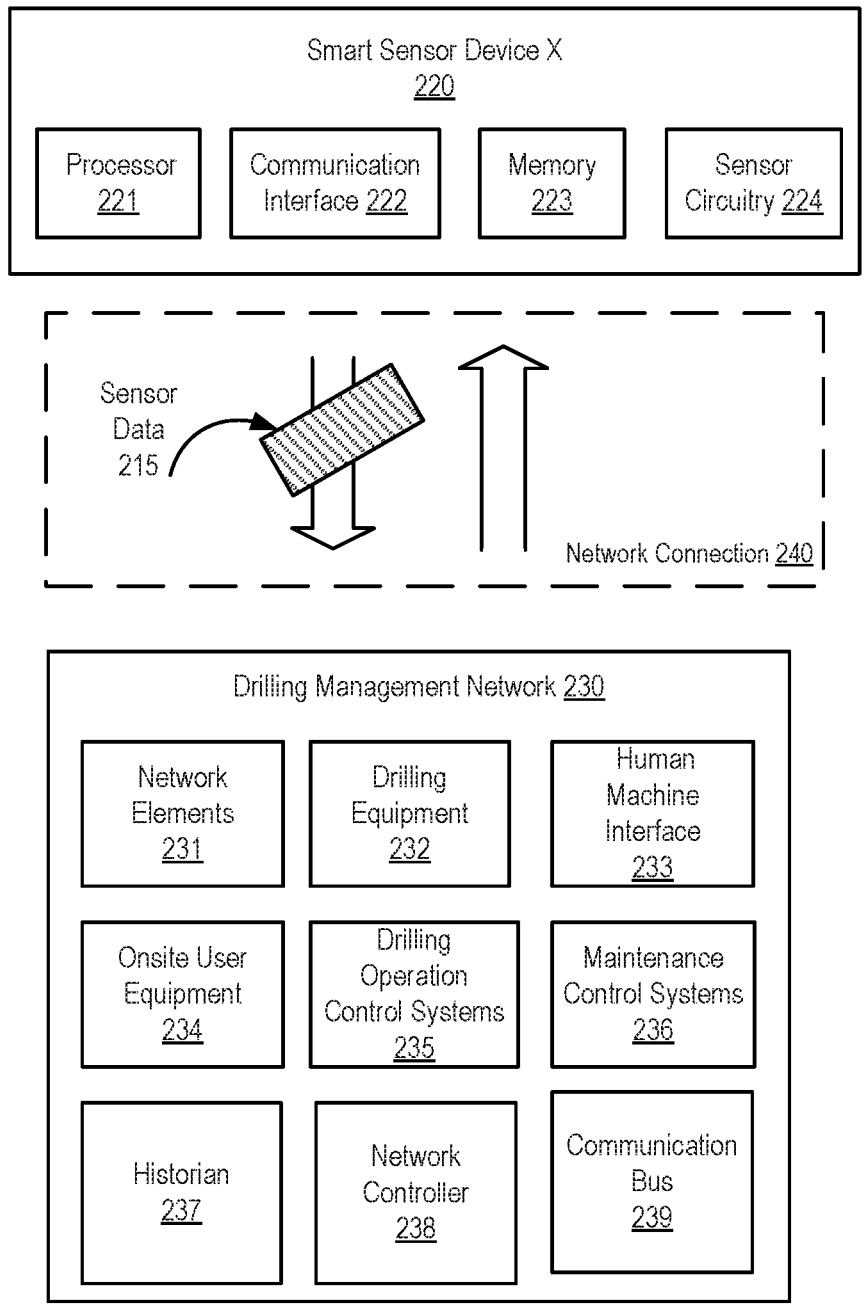

Turning to FIG. 2, FIG. 2 shows a block diagram of a system in accordance with one or more embodiments. As shown in FIG. 2, a drilling management network (230) may include a human machine interface (HMI) (e.g., HMI (233)), a historian (e.g., historian (237)), and various network elements (e.g., network elements (231)). A human machine interface may be hardware and/or software coupled to the drilling management network (230). For example, the HMI (233) may allow the operator to interact with the drilling system, e.g., to send a command to operate an equipment, or to view sensor information from drilling equipment. The human machine interface may include functionality for presenting data and/or receiving inputs from a user regarding various drilling operations and/or maintenance operations. For example, a human machine interface may include software to provide a graphical user interface (GUI) for presenting data and/or receiving control commands for operating a drilling rig. A network element may refer to various hardware components within a network, such as switches, routers, hubs or any other logical entities for uniting one or more physical devices on the network. In particular, a network element, the human machine interface, and/or the historian may be a computing system similar to the computing system (600) described in FIGS. 6.1 and 6.2, and the accompanying description.

In one or more embodiments, a smart sensor device (e.g., smart sensor device X (220)) is coupled to the drilling management network (230). In particular, a smart sensor device may include hardware and/or software that includes functionality to obtain one or more sensor measurements, e.g., a sensor measurement of an environment condition proximate the smart sensor device. The smart sensor device may process the sensor measurements into various types of sensor data (e.g., sensor data (215)). For example, the smart sensor device X (220) may include functionality to convert sensor measurements obtained from sensor circuitry (e.g., sensor circuitry (224)) into a communication protocol format that may be transmitted over the drilling management network (230) by a communication interface (e.g., communication interface (222)). Smart sensor devices may include pressure sensors, torque sensors, rotary switches, weight sensors, position sensors, microswitches, etc.

Moreover, a smart sensor device may include a processor (e.g., processor (221)), a communication interface (e.g., communication interface (222)), memory (e.g., memory (223)), and sensor circuitry (e.g., sensor circuitry (224)). The processor may be similar to the computer processor (602) described below in FIG. 7.1 and the accompanying description. The communication interface (222) may be similar to the communication interface (612) describe below in FIG. 7.1 and the accompanying description. The memory (223) may be similar to the non-persistent storage (604) and/or the persistent storage (606) described below in FIG. 7.1 and the accompanying description. The sensor circuitry (224) may be similar to various sensors (e.g., hookload sensor (94), block sensor (95), pressure sensor (92), etc.) described in FIG. 1 and the accompanying description.

In one or more embodiments, the drilling management network (230) may include drilling equipment (e.g., drilling equipment (232)) such as draw works (70), top drive, mud pumps and other components described above in FIG. 1 and the accompanying description). The drilling management network (230) may further include various drilling operation control systems (e.g., drilling operation control systems (235)) and various maintenance control systems (e.g., maintenance control systems (236)). Drilling operation control systems and/or maintenance control systems may include, for example, programmable logic controllers (PLCs) that include hardware and/or software with functionality to control one or more processes performed by a drilling rig, including, but not limited to the components described in FIG. 1. Specifically, a programmable logic controller may control valve states, fluid levels, pipe pressures, warning alarms, and/or pressure releases throughout a drilling rig. In particular, a programmable logic controller may be a ruggedized computer system with functionality to withstand vibrations, extreme temperatures, wet conditions, and/or dusty conditions, for example, around a drilling rig. Without loss of generality, the term "control system" may refer to a drilling operation control system that is used to operate and control the equipment, a drilling data acquisition and monitoring system that is used to acquire drilling process and equipment data and to monitor the operation of the drilling process, or a drilling interpretation software system that is used to analyze and understand drilling events and progress.

Moreover, drilling operation control systems and/or maintenance control systems may refer to control systems that include multiple PLCs within the drilling management network (230). For example, a control system may include functionality to control operations within a system, assembly, and/or subassembly described above in FIG. 1 and the accompanying description. As such, one or more of the drilling operation control systems (235) may include functionality to monitor and/or perform various drilling processes with respect to the mud circulation system, the rotating system, the hoisting system, a pipe handling system, and/or various other drilling activities described with respect to FIG. 1 and the accompanying description. Likewise, one or more of the maintenance control systems (236) may include functionality to monitor and/or perform various maintenance activities regarding drilling equipment located around a drilling rig. While drilling operation control systems and maintenance control systems are shown as separate devices in FIG. 2, in one or more embodiments, a programmable logic controller and other drilling equipment (232) on a drilling rig may be used in a drilling operation control system and a maintenance control system at the same time.

In one or more embodiments, a smart sensor device includes functionality to establish a network connection (e.g., network connection (240)) with one or more devices and/or systems (e.g., network controller (238), drilling operation control systems (235), maintenance control systems (236)) on a drilling management network. In one or more embodiments, for example, the network connection (240) may be an Ethernet connection that establishes an Internet Protocol (IP) address for the smart sensor device X (220). Accordingly, one or more devices and/or systems on the drilling management network (230) may transmit data packets to the smart sensor device X (220) and/or receive data packets from the smart sensor device X (220) using the Ethernet network protocol. For example, sensor data (e.g., sensor data (215)) may be sent over the drilling management network (230) in data packets using a communication protocol. Sensor data may include sensor measurements, processed sensor data based on one or more underlying sensor measurements or parameters, metadata regarding a sensor device such as timestamps and sensor device identification information, content attributes, sensor configuration information such as offset, conversion factors, etc. As such, the smart sensor device X (220) may act as a host device on the drilling management network (230), e.g. as a network node and/or an endpoint on the drilling management network (230). In one embodiment, one or more smart sensors may connect to the drilling management network through a power-over-Ethernet network.

In one or more embodiments, the drilling management network (230) may include a communication bus (e.g., communication bus (239)). For example, the communication bus (239) may include hardware, such as network components, wires, optical fibers, etc. that may connect one or more network elements on the drilling management network (230). Likewise, the communication bus (239) may include software, such as one or more communication protocols, that include functionality for transmitting sensor data between devices, e.g., smart sensor device X (220) and various control systems on the drilling management network (230). Moreover, the drilling management network (230) may include various network elements (e.g., network elements (231)) and/or onsite user equipment (e.g., onsite user equipment (234)). For example, onsite user equipment may include phone systems, personal computers for various users, printers, application servers, and/or file servers located around a drilling rig.

The drilling management network (230) may further include a network controller (238). In one or more embodiments, for example, the network controller (238) includes software and/or hardware that includes functionality for receiving requests from control systems to subscribe to respective sensor devices. Likewise, the network controller (238) may implement one or more communication protocols for transmitting sensor data throughout the drilling management network (230). For example, the network controller (238) may be a software-defined network (SDN) controller implemented on multiple network elements in the drilling management network (230).

While FIGS. 1 and 2 show various configurations of components, other configurations may be used without departing from the scope of the disclosure. For example, various components in FIGS. 1 and 2 may be combined to create a single component. As another example, the functionality performed by a single component may be performed by two or more components.

Figure 3:
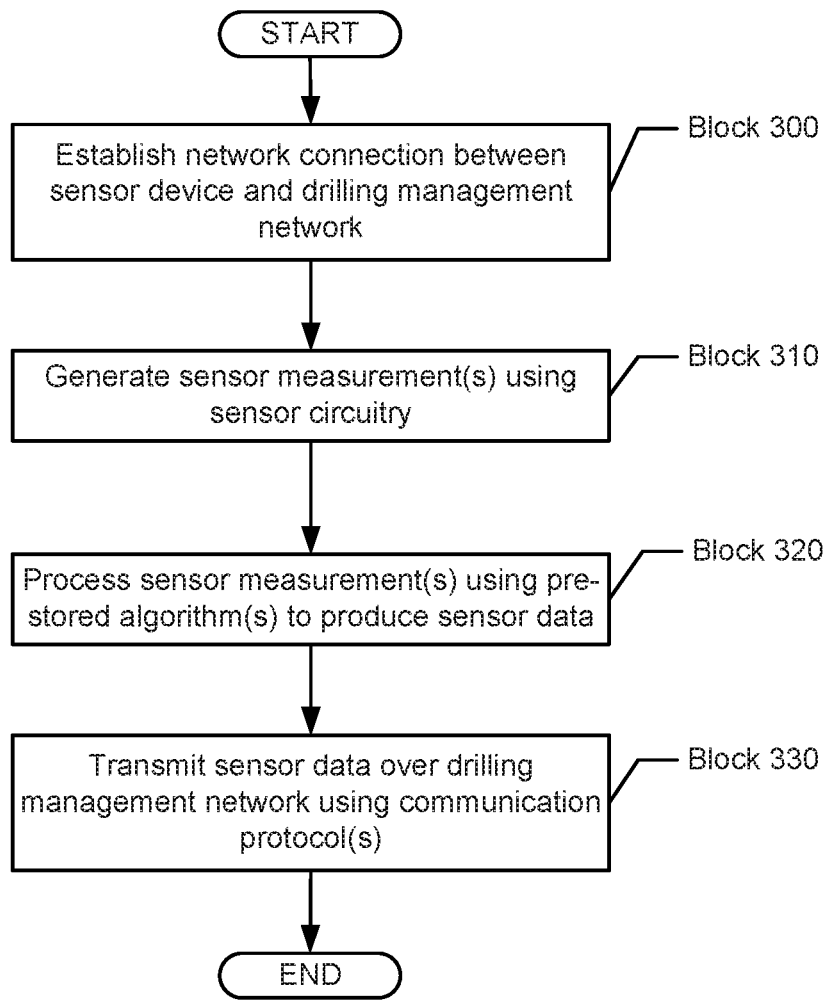
FIG. 3 shows a flowchart in accordance with one or more embodiments.

Turning to FIG. 3, FIG. 3 shows a flowchart in accordance with one or more embodiments. Specifically, FIG. 3 describes a method for communicating sensor data. One or more blocks in FIG. 3 may be performed by one or more components (e.g., smart sensor device X (220)) as described in FIGS. 1 and/or 2. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 300, a network connection is established between a sensor device a drilling management network in accordance with one or more embodiments. For example, a sensor device may form a network connection, such as an Ethernet connection, to a drilling management network. The network connection may be authenticated using password and/or other identification information from the sensor device. In one or more embodiments, for example, the sensor device has plug-and-play functionality where the sensor device can communicate directly with various network elements and/or control systems on the drilling management network. Moreover, the sensor device may be similar to the smart sensor device X (220) described in FIG. 2 and the accompanying description. In one or more embodiments, the sensor device connects to the drilling management network without a middle layer, e.g., a middle layer computer interfacing between the sensor device and the drilling management network. In one embodiment, the drilling management network may use a communication middleware, such as publisher and receiver to exchange data between different network nodes. An example of communication middleware is distributed data service (DDS). The smart sensor may support this communication middleware, such that its information can be readily shared with other network nodes when connected to the drilling management network.

In Block 310, one or more sensor measurements are generated using sensor circuitry in accordance with one or more embodiments. In particular, a sensor device may use sensor circuitry to detect one or more environmental conditions, such as temperature, pressure, torque, etc., proximate the sensor device. The sensor measurements may be digital and/or analog readings obtained by the sensor device.

In Block 320, one or more sensor measurements are processed using one or more pre-stored algorithms to produce sensor data in accordance with one or more embodiments. In one or more embodiments, for example, a sensor device converts sensor measurements (e.g., mA or voltage) to sensor data (e.g., pound force or psi). In particular, the sensor measurements, and/or sensor data may be converted into a predetermined communication protocol format for transmission over the drilling management network. For example, a pre-stored algorithm may correspond to various data frames inside a particular type of network packet. In one or more embodiments, one or more PLC capabilities (e.g., data computation and/or data communication) are integrated within a sensor device. Thus, the sensor data processing may be implemented at the sensor level to enable integration with the drilling management network.

Moreover, a sensor device may insert other information along with sensor measurements into the sensor data. For example, the sensor data may include publisher information, such as hardware identification information regarding the sensor device, source addresses, etc. In one or more embodiments, for example, the sensor device may insert information that a communication protocol uses to identify subscribers, such as tags, metadata, content attributes, and other data.

In one or more embodiments, a pre-stored algorithm is a multi-variable equation. For example, a pre-stored algorithm may obtain multiple inputs for one or more variables to generate sensor data. The sensor measurements in Block 310 may be one input to the pre-stored algorithm, while the other inputs may correspond to other parameters. For example, a pre-stored algorithm may be a pressure equation that has force and surface area as inputs to the pressure equation. The sensor circuitry may obtain force measurements, while the surface area may be a static and/or dynamic input to the pressure equation. These static and/or dynamic inputs may be pre-configured on the sensor device before it starts to calculate and transmit the sensor data to the drilling management network. For example, a user may remotely log into the sensor device over the drilling management network, and update the value of the surface area in the equation. The sensor data may be the output of the pressure equation using the updated value of the surface area and the current force value detected by sensor circuitry.

For a fluid volume calculation, the sensor device may measure the height of the fluid level in a tank, while the dimensions of the tank may be static values configured before the operation. The sensor data, to be transmitted to the drilling management network, may include both the fluid volume and the fluid level, among others. Likewise, the sensor device may obtain sensor measurements for temperature from sensor circuitry on the sensor device or from an external sensor device connected to the drilling management network. Likewise, the respective value for volume calculation, such as the dimensions of the tank, may be data values stored on the sensor device that may be updated where the dimensions of the tank changes, e.g. when a different mud tank is used in the drilling system.

In Block 330, sensor data is transmitted over a drilling management network using one or more communication protocols in accordance with one or more embodiments. Using a communication interface, for example, the sensor device may transmit sensor data to one or more control systems, one or more sensor devices, and/or one or more network elements in the drilling management network. In some embodiments, the sensor data includes sensor device identification information, sensor quality information, and/or sensor device configuration information. For example, a communication protocol may allow the sensor device to send the sensor data over an IP multicast to various control systems and network elements on the drilling management network. As such, the communication protocol may allow various devices, such as sensor devices and software applications operating on network elements, to work in a plug-and-play manner. In one or more embodiments, for example, the communication protocols include a data distribution service (DDS) communication protocol.

Turning to FIGS. 4.1 and 4.2, FIGS. 4.1 and 4.2 provide an example of transmitting sensor data over a drilling management network. The following example is for explanatory purposes only and not intended to limit the scope of the disclosed technology.

Turning to FIG. 4.1, FIG. 4.1 illustrates a sensor device Y (421) with a network connection to drilling management network A (430). As shown in FIG. 4.1, a communication path X (481) exists over the drilling management network A (430) between sensor device Y (421) and a programmable logic controller A (461). In particular, the sensor device Y (421) transmits sensor data Y (416) to the programmable logic control A (461) where the sensor data Y (416) may be used for one or more applications performed by the programmable logic controller A (461) and/or a middle layer computer (440) that is coupled to the programmable logic controller A (461). Thus, the sensor device Y (421) may communicate directly with the programmable logic controller A (461) or any other network elements, such as the middle layer computer (440), connected to the drilling management network A (430).

Keeping with FIG. 4.1, the PLC A (461) may process sensor measurements obtained from sensor device X (414) and output it to the middle layer computer (440) in a digestible format different from the communication protocol format of sensor data Y (416). Without the middle layer computer (440), sensor measurements from the sensor device X (414) may not be transmitted over the drilling management network (430) in a recognizable communication protocol format for consumption by other network devices, e.g., sensor device Y (421). In contrast, sensor device Y (421) may process sensor measurements into a communication protocol format that may be interpreted by any device with a network connection to the drilling management network A (430).

Turning to FIG. 4.2, FIG. 4.2 illustrates a control system X (435) that receives sensor data from sensor device M (422) and sensor device N (423). In particular, sensor data M (417) may be transmitted from sensor device M (422) to control system X (435) over communication path I (482). Likewise, sensor data N (418) may be transmitted from sensor device N (423) to the control system X (435) over communication path J (483). As shown in FIGS. 4.1 and 4.2, the communication paths (481, 482, 483) may be logical paths traversing various network nodes over the drilling management network A (430). For example, the communication paths (481, 482, 483) may include the same and/or different network elements, a common communication bus, and/or a changing network topology between the sensor devices (422, 423) and the control system X (435).

Figure 5:
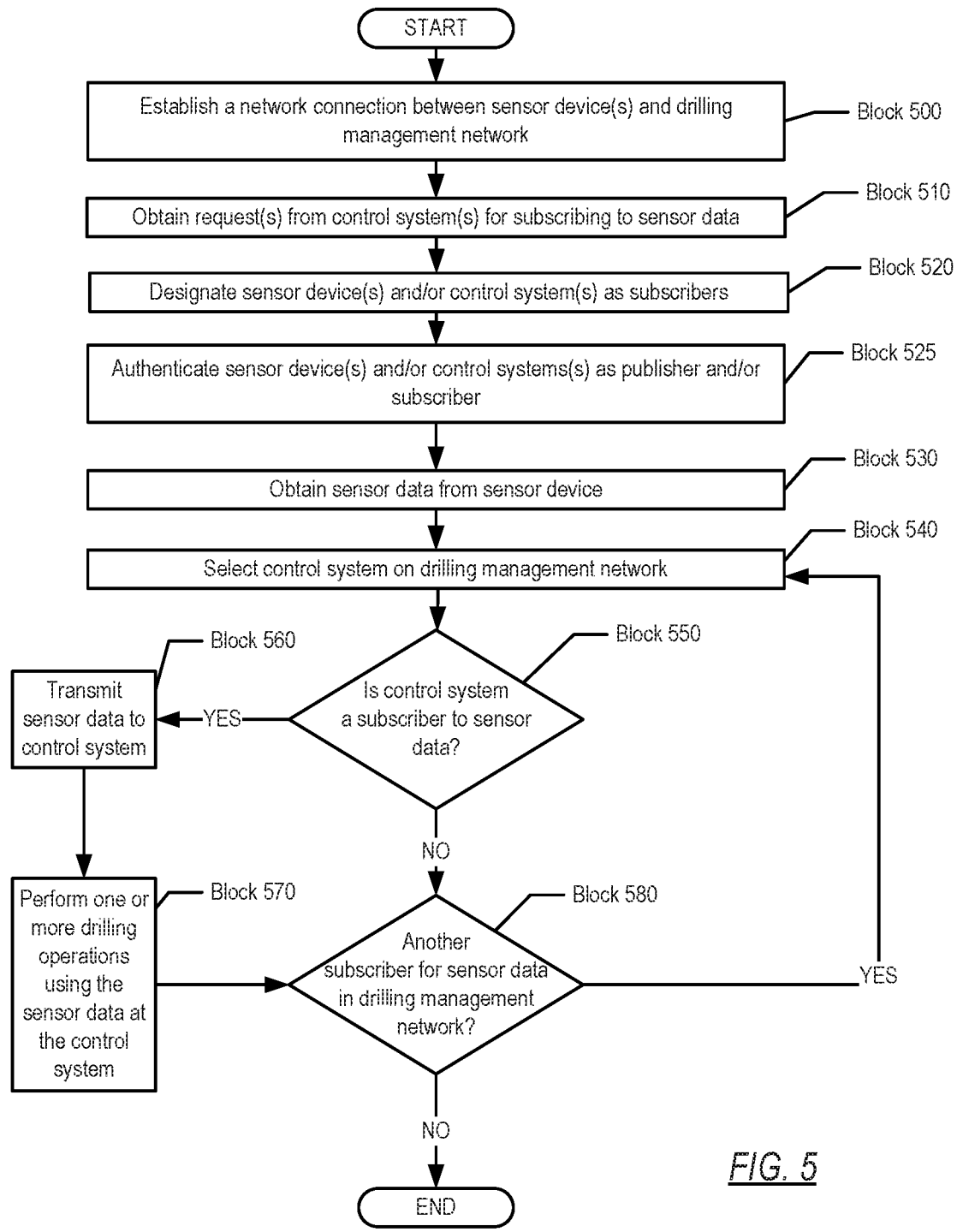
FIG. 5 shows a flowchart in accordance with one or more embodiments.

Turning to FIG. 5, FIG. 5 shows a flowchart in accordance with one or more embodiments. Specifically, FIG. 5 describes a method for communicating sensor data. One or more blocks in FIG. 5 may be performed by one or more components (e.g., drilling management network (230)) as described in FIGS. 1 and/or 2. While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 500, a network connection is established between one or more sensor devices and a drilling management network in accordance with one or more embodiments. Block 500 may be similar to Block 300 described above in FIG. 3 and the accompanying description.

In Block 510, one or more requests from one or more control systems are obtained for subscribing to sensor data in accordance with one or more embodiments. For example, using a communication protocol, a control system may request that the control system be identified as a subscriber to a particular sensor device and/or a type of sensor data in a particular virtual network or domain on a drilling management network. Thus, smart sensor devices publishing data in that particular virtual network or domain may be subscribed by this control system. However, smart sensor devices publishing in another virtual network or domain may be invisible to this control system and cannot be subscribed by this control system.

In Block 520, one or more control systems are designated as subscribers to sensor data in accordance with one or more embodiments. For example, one or more communication protocols may implement a software architecture that enables a publish-subscribe model among various network elements on and/or connected to the drilling management network. If a respective control system or a component of the respective control system is a subscriber for a particular sensor device in a particular virtual network or domain, sensor data from the sensor device may be relayed to the respective control system or the respective control system's component accordingly. If a sensor device has five subscribers, for example, sensor data from the sensor device may be transmitted to each of the five subscribers each time that sensor data is broadcast over the drilling management network. Thus, the sensor device may act as a publisher in the publish-subscribe model. In some embodiments, a drilling management network uses a security certificate to authenticate a device before it is allowed to publish or subscribe on a network.

Moreover, in designating a control system as a subscriber, a communication protocol may implement a topic-based system and/or a content-based system. In a topic-based system, sensor data is transmitted over the drilling management network according to one or more logical channels. In response to a request to become a subscriber, for example, a control system may be designated to receive sensor data allocated to a particular channel associated with the subscription. Thus, the communication protocol may identify subscribers of a particular channel according to IP addresses, hardware addresses, and other identification information and relay sensor data to subscribers of the channel.

In a content-based system, a subscriber defines one or more content attributes for analyzing sensor data. In one or more embodiments, for example, a content attribute corresponds to a class of sensor data. For example, sensor data classes may include different types of sensor data, such as temperature data, pressure data, alert notifications, etc. Moreover, a class may be defined according to a specific piece of equipment, such as a mud pump. Thus, a class of sensor data may include any sensor data obtained with respect to the mud pump. Likewise, a communication protocol, a subscriber, and/or another network element may analyze the sensor data to determine whether the sensor data matches one or more content attributes. For example, the content attributes may be stored in sensor data's metadata. Likewise, content attributes may include time-based attributes, such as data regarding sensor measurements that were obtained over a particular period of time. In another example, content attributes may correspond to different types of sensor data, such as pressure data, temperature data, torque data, etc. Content attributes may also specify a particular type of equipment on a drilling rig, e.g., sensor data relating to a mud pump. In one or more embodiments, for example, a maintenance control system subscribes to temperature data around a drilling rig. As such, the maintenance control system may receive any sensor data that relates to temperature data.

In Block 525, one or more sensor devices and/or one or more control systems are authenticated as a publisher and/or a subscriber in accordance with one or more embodiments. In some embodiments, for example, various security procedures and/or security protocols may be provided on a drilling management network that ensure only trusted and authenticated participants (e.g., publishers and/or subscribers) are allowed to publish and/or subscribed to sensor data in a particular virtual network or domain. Moreover, sensor devices and/or control systems may obtain security certificates that identify the respective device as a publisher and/or subscriber on the drilling management network. For example, a security certificate may be a digital key that authorizes a sensor device and/or a control system to transmit data across a virtual network to other authorized sensor devices and/or control systems. In some embodiments, a network controller on the drilling management network may act as a network broker between adding and/or removing subscribers from different types of sensor data and/or issuing security certificates to various devices. In some embodiments, a control system may send a request to cancel a subscription to a particular type of sensor data and/or sensor device.

In Block 530, sensor data is obtained from one or more sensor devices in accordance with one or more embodiments. For example, a drilling management network may obtain the sensor data over a network connection with the sensor device.

In Block 540, a control system is selected on a drilling management network in accordance with one or more embodiments. For example, a control system may be selected by a communication protocol operating on the network or by a network controller for administering a communication protocol.

In Block 550, a determination is made whether a control system is a subscriber to sensor data in accordance with one or more embodiments. For example, a communication protocol may iteratively select control systems associated with a particular type of sensor data and/or sensor device. In some embodiments, a subscription to sensor data corresponds to a virtual network on a drilling management network. As such, a communication protocol operating on the drilling management network may analyze various security certificates held by a control system to determine whether the control system or a sensor device has the corresponding security certificate for accessing the virtual network. If the control system has a subscriber security certificate, the control system may obtain sensor data over the virtual network. Likewise, if a sensor device has a publisher security certificate, the sensor device may transmit data to other devices on the virtual network.

Using the sensor data from Block 530, for example, the drilling management network may select a control system that is a subscriber to the sensor data. Likewise, in Blocks 540 and 550, different control systems may be selected to determine whether the respective control system is a subscriber to the sensor data. When a determination is made that the control system is a subscriber, the process may proceed to Block 560. When a determination is made that the control system is not a subscriber, the process may return to Block 580.

In Block 560, sensor data is transmitted to a control system in accordance with one or more embodiments. For example, sensor data may be transmitted in a similar manner as described above in Block 330 and the accompanying description. Moreover, sensor data may be directed to one or more components on the control system. For example, a control system may include multiple PLCs. Thus, for example, two PLCs in the control system may use the sensor data, while a third PLC in the control system may ignore the sensor data. Likewise, while a control system may be publisher or subscriber or both, one or more components, such as individual PLCs, may also be publishers and/or subscribers on the drilling management network.

In Block 570, one or more drilling operations are performed at a control system using sensor data in accordance with one or more embodiments. For example, the sensor data may be used in one or more drilling operations and/or maintenance operations with respect to a drilling rig. Through communication directly with a sensor device, various remote calibration operations may be performed on the sensor device and/or in connection with the sensor device. For example, other drilling equipment in the drilling management network may be calibrated using sensor data from the sensor device.

Furthermore, by obtaining sensor data directly from the sensor device, uptime and downtime on the drilling rig may be reduced. For example, where a hardware or software failure exists among a system that includes a sensor device, a middle layer computer, and a programmable logic controller, the failure may need to be independently verified among the system's components. On the other hand, when the sensor data identifies a hardware or software failure, the failure may be diagnosed at the sensor device originating the sensor data. For example, a network controller or a remote user may analyze sensor to determine whether a sensor circuitry fails one or more predetermined criteria. In response to analyzing the sensor data, for example, various settings in the sensor device may be adjusted in order to address the failure and satisfy the predetermined criteria. Thus, obtaining sensor data directly from the sensor device may reduce non-productive time resulting from a failure at the sensor device. Other opportunities may also exist such as preventive maintenance on the sensor device.

In some embodiments, for example, a subscriber control system automatically reconfigures a publisher sensor device in response to analyzing sensor data from the publisher sensor device. A predetermined criterion may be an error band for sensor measurements obtained by sensor circuitry in the publisher sensor device. By analyzing the published sensor data, the subscriber control system may detect an offset error with the sensor circuitry. Thus, the control system may connect directly to the publisher sensor device over the drilling management network to adjust automatically one or more settings on the publisher sensor device in order that the sensor measurements from the sensor device satisfy the error band.

In Block 580, a determination is made whether another subscriber exists in drilling management network in accordance with one or more embodiments. When a determination is made that the sensor data has not been sent to one or more subscribers, the process may proceed to Block 540. When a determination is made that no more subscribers exist for the sensor data, the process may end.

Moreover, in one or more embodiments, the processes described above in FIGS. 3 and 5 may enable sensor data to be shared and communicated without using a programmable logic controller. For example, in a centric system, various logical channels for data transmission, e.g. from a sensor device to a software application, may have to be established, configured and maintained throughout the drilling process. As such, the maintenance of such a centric system may increase costs. In particular, whether the costs include adding network elements, removing or replacing a network element, related costs may grow exponentially. Thus, the processes described in FIGS. 3 and 5 may enable sensor devices and/or the drilling management network to decentralize sensor data communication.

While FIGS. 2, 3, 4.2, and/or 5 above describe various control systems in connection with the disclosed technology, in some embodiments, various processes described above may also be applied to acquisition systems, a job monitoring system, and/or data interpretation software systems. For example, the same sensor data from a smart sensor device may be transmitted to a control system, a job monitoring system, a data acquisition system, and a data interpretation software system.

Embodiments may be implemented on a computing system. Any combination of mobile, desktop, server, router, switch, embedded device, or other types of hardware may be used. For example, as shown in FIG. 6.1, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (600) in FIG. 6.1 may be connected to or be a part of a network. For example, as shown in FIG. 6.2, the network (620) may include multiple nodes (e.g., node X (622), node Y (624)). Each node may correspond to a computing system, such as the computing system shown in FIG. 6.1, or a group of nodes combined may correspond to the computing system shown in FIG. 6.1. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (600) may be located at a remote location and connected to the other elements over a network.

Although not shown in FIG. 6.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6.1. Further, the client device (626) may include and/or perform all or a portion of one or more embodiments of the disclosure.

The computing system or group of computing systems described in FIGS. 6.1 and 6.2 may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system (600) in FIG. 6.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 6.1, while performing one or more embodiments of the disclosure, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 6.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 6.1 and the nodes and/or client device in FIG. 6.2. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method, comprising:
   establishing a network connection between a sensor device and a drilling management network;
   obtaining, from a first control system in the drilling management network, a request for first sensor data from a sensor device coupled to the drilling management network; and
   transmitting, using a communication protocol and over the drilling management network, the first sensor data from the sensor device to the first control system.

2. The method of claim 1, further comprising:
   obtaining, from the sensor device, the first sensor data at the drilling management network;
   determining whether a second control system in the drilling management network subscribes to the sensor device; and
   transmitting, through the drilling management network and in response to determining that the second control system subscribes to the sensor device, the first sensor data to the second control system.

3. The method of claim 2,
   wherein determining whether the second control system subscribes to the sensor device comprises authenticating whether the sensor device has a predetermined security certificate,
   wherein the predetermined security certificate corresponds to access to a virtual network operating on the drilling management network, and
   wherein the sensor device is a publisher on the virtual network.

4. The method of claim 1, further comprising:
   obtaining, from a second control system in the drilling management system, a request to obtain a class of sensor data;
   obtaining, from the sensor device, the first sensor data at the drilling management network;
   determining whether the first sensor data corresponds to the class of sensor data proximate the drilling rig; and
   transmitting, in response to determining that the first sensor data corresponds to the class of sensor data, the first sensor data to the second control system.

5. The method of claim 1,
   wherein the drilling management network comprises a communication bus coupled to a plurality of control systems, and
   wherein the communication protocol transmits the first sensor data to one or more subscriber devices over the communication bus to the plurality of control systems.

6. The method of claim 1,
   wherein the sensor device comprises a processor, a communication interface, and sensor circuitry configured to obtain a sensor measurement,
   wherein the sensor measurement is converted by the sensor device into the first sensor data according to a communication protocol format, and
   wherein the sensor device transmits the first sensor data over the drilling management network using the communication interface.

7. The method of claim 1,
   wherein the sensor device comprises a processor and sensor circuitry configured to obtain a sensor measurement of an environmental condition proximate the sensor device, and wherein the sensor device comprises a memory that comprises instructions that generate, using the processor, the first sensor data using an equation with the sensor measurement.

8. The method of claim 1, further comprising:
analyzing, by the first control system, the first sensor data to determine whether sensor circuitry in the sensor device satisfies a predetermined criterion; and
in response to determining that the sensor circuitry fails the predetermined criterion and by the first control system, automatically adjusting one or more settings in the sensor device in order to satisfy the predetermined criterion.

9. The method of claim 8,
wherein the predetermined criterion is a predetermined error band for a sensor measurement that is obtained by sensing circuitry in the sensor device,
wherein failing to satisfy the predetermined criterion comprises detecting an offset error by the sensing circuitry, and
wherein adjusting the one or more settings comprises resetting an offset for the sensing circuitry to produce the sensor measurements disposed in the predetermined error band.

10. The method of claim 1,
wherein the network connection is an Ethernet connection, and
wherein the Ethernet connection establishes an Internet Protocol (IP) address on the drilling management network for the sensor device.

11. The method of claim 1,
wherein the communication protocol implements a publish-subscribe messaging architecture on the drilling management network using an Internet Protocol (IP) multicast.

12. A system, comprising:
a sensor device comprising a communication interface and sensor circuitry;
a drilling management network coupled to the sensor device, the drilling management network comprising a first control system and a plurality of network elements;
wherein the drilling management network is configured to:
establish a network connection between the sensor device and the drilling management network;
obtain, from a first control system in the drilling management network, a request for first sensor data from the sensor device; and
transmit, using a communication protocol, the first sensor data from the sensor device to the first control system, wherein the first control system comprises a programmable logic controller configured to perform one or more drilling operations with a drilling rig using the first sensor data.

13. The system of claim 12, wherein the drilling management network is further configured to:
obtain, from the sensor device, the first sensor data at the drilling management network;
determine whether a second control system in the drilling management network subscribes to the sensor device; and
transmit, through the drilling management network and in response to determining that the second control system subscribes to the sensor device, the first sensor data to the second control system.

14. The system of claim 12, wherein the drilling management network is further configured to:

obtain, from a second control system in the drilling management system, a request to obtain a class of sensor data;
obtain, from the sensor device, the first sensor data at the drilling management network;
determine whether the first sensor data corresponds to the class of sensor data; and
transmit, in response to determining that the first sensor data corresponds to the class of sensor data, the first sensor data to the second control system.

15. The system of claim 12, wherein the drilling management network is further configured to:
obtain, at a network controller in a drilling management network, second sensor data from the sensor device, wherein the network connection is between the network controller and the drilling management network;
analyze the second sensor data to determine whether sensor circuitry in the sensor device satisfies a predetermined criterion; and
in response to determining that the sensor circuitry fails the predetermined criterion, adjust one or more settings in the sensor device in order to satisfy the predetermined criterion.

16. A sensor device, comprising:
a communication interface;
a processor;
sensor circuitry; and
memory comprises instructions executable by the processor and configured to:
establish a network connection with a drilling management network;
generate, using sensor circuitry, at least one sensor measurement regarding one or more environmental conditions proximate the sensor device;
process the at least one sensor measurement to produce sensor data; and
transmit, using a communication protocol, the sensor data to a first control system located on the drilling management network, wherein the first control system comprises a programmable logic controller that is configured to perform one or more drilling operations with a drilling rig using the sensor data.

17. The sensor device of claim 16,
wherein the sensor circuitry is configured to obtain a sensor measurement, and
wherein the memory further comprises instructions executable by the processor and configured to:
convert the sensor measurement into the sensor data according to a communication protocol format, and
transmit the sensor data over the drilling management network using the communication interface.

18. The sensor device of claim 16,
wherein the sensor circuitry is configured to obtain a sensor measurement of an environmental condition proximate the sensor device, and
wherein the memory further comprises instructions executable by the processor and configured to:
generating the sensor data using an equation with the sensor measurement to produce the sensor data.

19. The sensor device of claim 16,
wherein the memory further comprises a security certificate configured to authenticate an identify of the sensor device within the drilling management network.

20. The sensor device of claim 16,
wherein the memory further comprises instructions, when executable by the processor, configured to transmit data over the drilling management network, the data being selected from a group consisting of: sensor device identification information, sensor quality information, and sensor device configuration information.

* * * * *